(12) United States Patent
Al Sayeed et al.

(10) Patent No.: US 9,344,191 B2
(45) Date of Patent: May 17, 2016

(54) SYSTEMS AND METHODS FOR CAPACITY CHANGES IN DWDM NETWORKS INCLUDING FLEXIBLE SPECTRUM SYSTEMS

(71) Applicants: Choudhury A. Al Sayeed, Gloucester (CA); Mohammad Mehdi Mansouri Rad, Ottawa (CA); Dave C. Bownass, Ottawa (CA); Loren S. Berg, Richmond (CA)

(72) Inventors: Choudhury A. Al Sayeed, Gloucester (CA); Mohammad Mehdi Mansouri Rad, Ottawa (CA); Dave C. Bownass, Ottawa (CA); Loren S. Berg, Richmond (CA)

(73) Assignee: Ciena Corporation, Hanover, MD (US)

( * ) Notice: Subject to any disclaimer, the term of this patent is extended or adjusted under 35 U.S.C. 154(b) by 149 days.

(21) Appl. No.: 14/068,807

(22) Filed: Oct. 31, 2013

(65) Prior Publication Data

US 2015/0117858 A1  Apr. 30, 2015

(51) Int. Cl.
| | | |
|---|---|---|
| H04J 14/02 | (2006.01) | |
| H04B 10/079 | (2013.01) | |
| H04B 10/293 | (2013.01) | |
| H04B 10/075 | (2013.01) | |

(52) U.S. Cl.
CPC ...... *H04B 10/07955* (2013.01); *H04B 10/2935* (2013.01); *H04J 14/0221* (2013.01); *H04B 10/075* (2013.01); *H04J 14/0201* (2013.01)

(58) Field of Classification Search
None
See application file for complete search history.

(56) References Cited

U.S. PATENT DOCUMENTS

| | | | | |
|---|---|---|---|---|
| 7,123,834 | B2 | 10/2006 | Hullin et al. | |
| 7,444,078 | B1* | 10/2008 | Stango | H04J 14/0217 359/334 |
| 7,627,244 | B2* | 12/2009 | Fujita | H04B 10/077 398/10 |
| 7,873,274 | B2* | 1/2011 | Collings | H04B 10/07955 398/18 |
| 8,260,141 | B2 | 9/2012 | Berg | |
| 8,364,036 | B2* | 1/2013 | Boertjes | H04J 14/0201 398/13 |
| 9,276,696 | B2* | 3/2016 | Al Sayeed | H04J 14/0221 |
| 2004/0208577 | A1* | 10/2004 | Cahill | 398/83 |
| 2008/0253764 | A1* | 10/2008 | Collings et al. | 398/37 |
| 2008/0285973 | A1* | 11/2008 | Uchiyama | H04B 10/07955 398/83 |
| 2011/0188851 | A1* | 8/2011 | Oda et al. | 398/26 |
| 2013/0045006 | A1* | 2/2013 | Dahan et al. | 398/34 |

* cited by examiner

*Primary Examiner* — Ken N Vanderpuye
*Assistant Examiner* — Jai Lee
(74) *Attorney, Agent, or Firm* — Clements Bernard PLLC; Christopher L. Bernard; Lawrence A. Baratta, Jr.

(57) ABSTRACT

A method, a controller, and an optical section include performing an analysis to determine an amount of power offset on any in-service channels in an optical section due to a capacity change with a channel; defining a step size to ensure the capacity change does not exceed an offset limit based on the analysis; performing the capacity change in one or more iterations using the step size to limit the capacity change; and performing an optimization between each of the one or more iterations to adjust amplifier gains in the optical section to compensate for offsets on the in-service channels caused by a previous iteration.

20 Claims, 12 Drawing Sheets

SYSTEMS AND METHODS FOR CAPACITY CHANGES IN DWDM NETWORKS INCLUDING FLEXIBLE SPECTRUM SYSTEMS

FIELD OF THE DISCLOSURE

The present disclosure relates generally to optical transmission systems and methods. More particularly, the present disclosure relates to systems and methods for capacity changes in a Dense Wave Division Multiplexed (DWDM) network including flexible spectrum systems.

BACKGROUND OF THE DISCLOSURE

With increasing demands for bandwidth (BW) in optical networks, technologies are evolving to transmit more bits per second over optical spectrum. Optical spectrum has been standardized such as in ITU-T Recommendation G.694.1 (June 2002) "Spectral grids for WDM applications: DWDM frequency grid" and ITU-T Recommendation G.698.2 (November 2009) "Amplified multichannel DWDM applications with single channel optical interfaces," the contents of each are incorporated by reference herein. The optical spectrum can be segmented into transmission windows at different wavelengths such as the C band which is about 1530 to 1565 nm and which corresponds to the gain bandwidth of erbium doped fiber amplifiers (EDFAs). Other transmission windows can include the L band (about 1565 to 1625 nm), the S band (about 1460 to 1530 nm), etc. Conventionally, DWDM networks typically use a fixed bandwidth (e.g., 25, 50, 100, or 200 GHz) centered on the ITU grid for each channel (i.e., wavelength). This can be referred to as a gridded DWDM optical spectrum, i.e. each channel occupies a spot on the grid in an associated transmission window. However with higher number of bits per second (especially beyond 100 Gbps), it is getting increasingly complex to fit the channels within a fixed spectral bandwidth (BW). It requires allocating larger bandwidths to fit those high baud rate signals that cannot respect the fixed grid ITU spectrum anymore. Accordingly, there is a movement towards "gridless" or flexible DWDM spectrum where the slot width of the channels is flexible and/or variable (i.e., the slot width is uncertain before a frequency slot is allocated). Optimal spectrum utilization or spectral mining is another reason to move forwards with flexible spectrum solutions where more channels can be embraced together without having any guard band in between that can potentially occupy the full DWDM spectral bandwidth. For comparisons, in a conventional gridded system, each channel has a predetermined bandwidth, i.e. 25, 50, 100, or 200 GHz, but in flexible spectrum systems, each channel has a variable bandwidth of N GHz, where N can be any amount of bandwidth and can be different for each channel.

Referring to FIG. 1, in an exemplary embodiment, a graph of optical spectrum illustrates an exemplary flexible spectrum system 10. The flexible spectrum system 10 includes four channels 12, 14, 16, 18. The first two channels 12, 14 each occupy 50 GHz of bandwidth with guard bands 20 therebetween. A conventional gridded system using 50 GHz spacing would include each channel on the optical spectrum being similar to the channels 12, 14. The third channel 16 occupies 400 GHz BW and can be, for example, a 2 Tbps signal. The fourth channel 18 is a 4×100 Gbps signal with each of the 100 Gbps signals occupying 37.5 GHz BW for a total of 150 GHz. The channels 16, 18 can be referred to as 'super' channels and will be more common as more advanced modulation techniques are utilized to increase the number of bits per second over the optical spectrum. In conventional gridded systems, adding or deleting a channel has minimal impact on existing in-service channels since there are many channels in such gridded systems and adding or deleting a single channel has a manageable impact overall. This capacity change problem (i.e., adding or deleting a channel) is significantly more pronounced in flexible spectrum networks since it is no longer adding one channel among many as in gridded systems, but could be adding or deleting a significant portion of the spectrum. For example, adding or deleting the channel 16, 18 will have significant impacts on the other channels 12, 14 in-service.

Thus, capacity changes with flexible spectrum in an optical transmission line system remain as a strong challenge.

BRIEF SUMMARY OF THE DISCLOSURE

In various exemplary embodiments, systems and methods for capacity changes in a DWDM network are described which are especially useful in flexible spectrum systems. The capacity changes include adding channels, deleting channels, or both concurrently. The systems and methods specifically deal with the complexity of accumulating offset on existing in-service channels' power due to non-linear characteristics of the DWDM network and its associated components. The systems and methods keep the offset on the in-service channels within a predefined limit through controller iterations of the capacity changes, and significantly reduce the overall capacity change timing irrespective of the spectral grid, bandwidth size, and spectral location of the channels.

In an exemplary embodiment, a method includes performing an analysis to determine an amount of power offset on any in-service channels in an optical section due to a capacity change with a channel; defining a step size to ensure the capacity change does not exceed an offset limit based on the analysis; performing the capacity change in one or more iterations using the step size to limit the capacity change; and performing an optimization between each of the one or more iterations to adjust amplifier gains in the optical section to compensate for offsets on the in-service channels caused by a previous iteration. The method can further include adjusting the step size in each of the one or more iterations for the capacity change of the channel. The capacity change can include one of adding or deleting channel of a flexible amount of bandwidth. The method can further include performing the analysis to determine a worst case that the in-service channels can tolerate when adding or deleting the channel.

The method can further include simultaneously performing an addition and a deletion of the channel and a second channel and interleaving the optimization therebetween. Optionally, the capacity change can include adding or deleting channels in a flexible spectrum irrespective of the number of channels, their bandwidth size or location in the flexibly gridded spectrum. Alternatively, the capacity change can include adding or deleting channels in the fixed grid spectrum irrespective of the number of channels, their bandwidth size or location in the fixed grid spectrum. The optical section can include start of a channel access site until the start of a next channel access site, and wherein channel access utilizes any of Wavelength Selective Switch (WSS) based Reconfigurable Optical Add/Drop Multiplexers (OADMs) (ROADMs), Tunable OADMs (TOADMs), or Group OADMs (GOADMs), Colorless-Directionless, and Contentionless-Directionless-Colorless architectures. The optical section can include at least one Raman optical amplifier. The method can further include performing the analysis due to a capacity change with a channel via one of simulation or experimentation and deriving a mathematical expression based thereon to compute the step size. The method can further include based on available margin in terms of optical signal to noise ration (OSNR), bit error rate (BER), or Q-Factor in dB (dBQ), accelerating or decelerating the step size in each of the one or more iterations for the capacity change of the channel.

In another exemplary embodiment, a controller includes an interface to one or more optical devices in an optical section; a processor communicatively coupled to the interface; and memory storing instructions that, when executed, cause the processor to: perform an analysis to determine an amount of power offset on any in-service channels in an optical section due to a capacity change with a channel; define a step size to ensure a capacity change does not exceed an offset limit based on the analysis; cause the one or more optical devices to perform the capacity change in one or more iterations using the step size to limit the capacity change; and cause the one or more optical devices to perform an optimization between each of the one or more iterations to adjust amplifier gains in the optical section to compensate for offsets on the in-service channels caused by a previous iteration. The instructions, when executed, can further cause the processor to: adjust the step size in each of the one or more iterations for the capacity change of the channel. The capacity change can include one of adding or deleting channel of a flexible amount of bandwidth, and the instructions, when executed, can further cause the processor to: perform the analysis to determine a worst case that the in-service channels can tolerate when adding or deleting the channel.

The instructions, when executed, can further cause the processor to: simultaneously perform an addition and a deletion of the channel and a second channel and interleaving the optimization therebetween. Optionally, the capacity change can include adding or deleting channels in a flexible spectrum irrespective of the number of channels, their bandwidth size or location in the flexibly defined spectrum; and alternatively, the capacity change can include adding or deleting channels in the fixed grid spectrum irrespective of the number of channels, their bandwidth size or location in the fixed grid spectrum. The optical section can include start of a channel access site until the start of a next channel access site, and wherein channel access utilizes any of Wavelength Selective Switch (WSS) based Reconfigurable Optical Add/Drop Multiplexers (OADMs) (ROADMs), Tunable OADMs (TOADMs), or Group OADMs (GOADMs), Colorless-Directionless, and Contentionless-Directionless-Colorless architectures. The instructions, when executed, can further cause the processor to: perform the analysis due to a capacity change with a channel via one of simulation or experimentation and deriving a mathematical expression based thereon to compute the step size.

In yet another exemplary embodiment, an optical section includes a first channel access point; a second channel access point; one or more amplifiers between the first channel access point and the second channel access point; and a controller communicatively coupled to the first channel access point, the second channel access point, and the one or more amplifiers, wherein the controller is configured to: perform an analysis to determine an amount of power offset on any in-service channels in an optical section defined between the first channel access point and the second channel access point due to a capacity change with a channel; define a step size to ensure a capacity change does not exceed an offset limit based on the analysis; cause the first channel access point, the second channel access point, and the one or more amplifiers to perform the capacity change in one or more iterations using the step size to limit the capacity change; and cause the first channel access point, the second channel access point, and the one or more amplifiers to perform an optimization between each of the one or more iterations to adjust amplifier gains in the optical section to compensate for offsets on the in-service channels caused by a previous iteration. The capacity change can include adding or deleting channels in a flexibly defined spectrum irrespective of the number of channels, their bandwidth size or location in the flexibly defined spectrum.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
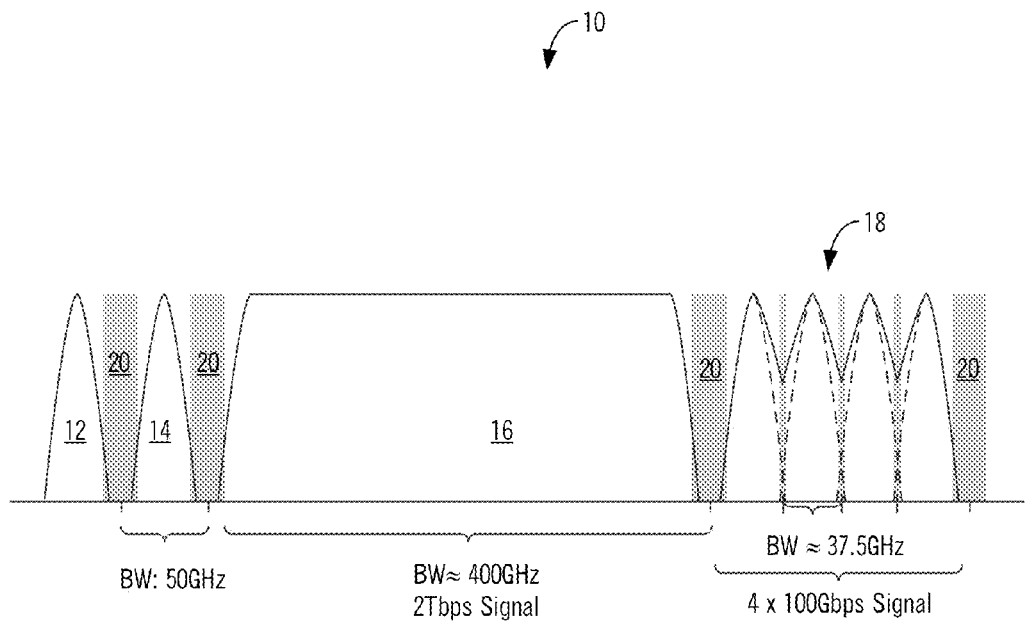
FIG. 1 is a graph of optical spectrum of an exemplary flexible spectrum system.

In various exemplary embodiments, systems and methods for capacity changes in a DWDM network, such as flexible spectrum systems, are described. Capacity changes in the DWDM network can include adding new optical channels or deleting existing optical channels from the line system. Any capacity change usually appears with the complexity of accumulating offset on the existing in-service channels' power due to non-linear characteristics of optical line system and its associated components. The systems and methods deal with offset on in-service channels for adding/deleting in a flexible spectrum accompanied with large bandwidth channels or spectrally tied super-channels. The systems and methods for capacity changes keep the offset on the in-service channels within a predefined limit, and significantly reduce the overall capacity change timing irrespective of the spectral grid, bandwidth size, and spectral location of the channels. The systems and methods change the power in the overall spectrum in small incremental steps considering the worst case offset situation for in-service channels and then take out the accumulated offset between each incremental step. This helps to normalize a system in terms of capacity changes that allows channel addition and/or deletion in any part of the spectrum irrespective of the spectral location of in-service channels, their bandwidth, spectral grid (flex or fixed), and the number of channels involved with capacity change. The systems and methods also allow agility in terms of photonic actions making it non-blocking for channel add and delete actions and getting rid of sequential bundled channel actions.

Again, capacity changes with flexible spectrum in an optical transmission line system remain as a strong challenge. The challenges appear due to non-linear characteristics of optical fiber, the stimulated Raman scattering (SRS) and wavelength dependent loss (WDL) that build up over the large bandwidth optical channel while traversing through the optical fiber. While adding or deleting such large bandwidth channels, the spectral loading changes over the optical spectrum that creates some dynamic and static offsets on other in-service channels such as narrow band in-service channels. The basic problem with changing spectral loading is that the amplifier is not truly homogeneous in its performance as most of all erbium doped fiber amplifier (EDFA) models assume. In the homogeneous model, no matter how the spectral loading is, the amplifier derives almost the same gain shape at a particular gain. However, amplifiers have inhomogeneity often termed as spectral hole burning (SHB) that drives the majority of the offset behavior. Most of the amplifier can be designed to track the dynamic portion of the transient offsets by using fast gain control up within the amplifiers that can handle fast changes in spectral loading. By improvising slower changes in spectral loading (typically in 1000's of milliseconds), the dynamic offset effect on the in-service channels can be severely mitigated as well. The dominant effect, however, is the static offset that is left over after a change in spectral loading whether intentional or unintentional. Even though before and after the spectral change the amplifiers produce the same average gain, the spectral shape still gets changed that is primarily driven by spectral hole burning and to lesser extents by SRS, provisioned tilt, and finally amplifier ripple. It is this offset that the algorithm described herein concentrate to mitigate while doing a controlled non-service affecting capacity change in the network.

Figure 2:
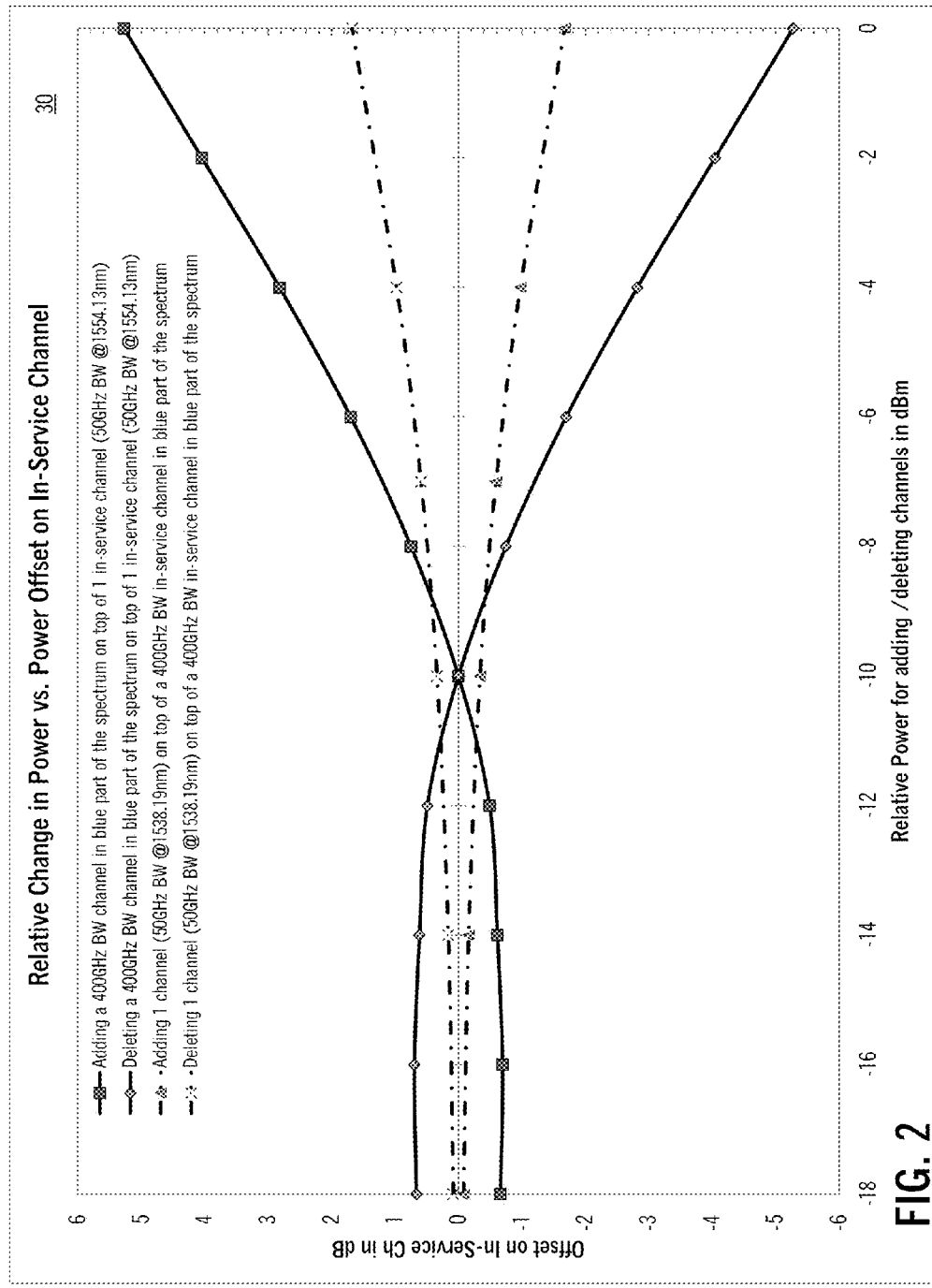
FIG. 2 is a graph of typical examples of relative power offset on in-service channel(s) due to a capacity change.

Referring to FIG. 2, in an exemplary embodiment, a graph 30 illustrates typical examples of relative power offset on in-service channel(s) due to a capacity change. The graph 30 includes four example capacity changes 32, 34, 36, 38. The amount of static offsets following a capacity change depends on the location on the spectrum where the capacity change took place and on the number of amplifiers cascaded in the line system. The offset in terms of overshoot or undershoot on in-service channels grows almost linearly with the number of amplifiers in the line system. That is, a higher number of amplifiers will generate larger offsets on in-service channels although the maximum amount of offset becomes saturate after a certain number of amplifiers. The graph 30 is presented to illustrate the amount of offset in an exemplary six span optical DWDM system with seven EDFA amplifiers operating in the C band. Specifically, the graph 30 is the result of performing an analysis based on the underlying optical section (e.g., in FIG. 2, the optical section includes 6 spans with a total of 7 EDFAs), in-service channels, and the channels added/deleted. This analysis can be performed through simulations, algorithms, and/or experimentation. The graph 30 is the result of the analysis showing the amount of offset expected on the in-service channels based on the added or deleted channel. This analysis can be specific based on various variables such as the components of the optical section, the in-service channels, and the added/deleted channels.

The capacity change 32 includes adding a 400 GHz bandwidth channel in a blue part of the spectrum along with an existing in-service channel at 50 GHz bandwidth and located at 1554.13 nm. The capacity change 34 includes deleting a 400 GHz bandwidth channel in a blue part of the spectrum along with an existing in-service channel at 50 GHz bandwidth and located at 1554.13 nm. The C band can be further segmented into the blue band which is the lower half of the C band spectrum and a red band with is an upper half of the C band spectrum. The capacity change 36 includes adding one channel at 50 GHz bandwidth at 1538.19 nm with an existing 400 GHz bandwidth in-service channel in the blue part of the spectrum. Finally, the capacity change 38 includes deleting one channel at 50 GHz bandwidth at 1538.19 nm with an existing 400 GHz bandwidth in-service channel in the blue part of the spectrum.

The graph 30 illustrates how the power offset on the in-service channel can grow during addition or deletion of a large bandwidth flexible spectrum channel into the line system. Specifically, the Y-axis of the graph 30 illustrates offset on the in-service channel in dB while the X-axis of the graph illustrates the relative power for the added or deleted channel in dBm. As illustrated in the graph 30, if the 400 GHz channel is added or deleted in the blue part of the spectrum (starting @ 1530.33 nm) keeping a single channel (50 GHz BW centered @ 1554.13 nm) in-service, i.e. the capacity changes 32, 34, the amount of additional steady-state power offset on the in-service channel can be as high as almost ±5.5 dB relative to the channel's previous steady-state power profile. A similar such offset or tilt can be generated on the in-service large-BW channel if a single narrow-band channel is added in some parts of the spectrum, i.e. the capacity changes 36, 38. The graph 30 is for the C band DWDM spectrum and similar issue exists as well for L band DWDM transmission spectrum. As mentioned earlier, the amount of offset primarily depends on (1) the number of cascaded amplifiers in the line system, and (2) the location of the in-service channel(s) and the part of the spectrum where the capacity change will take place, and is dominated by the spectral hole burning effect, SRS, tilt, and ripple introduced by each amplifier.

Having such an offset on the in-service channel can lead to several issues. If in-service channels overshoot into the fiber, SPM (self-phase modulation) is the first non-linearity effect appears that degrades signal quality significantly and may disrupt the traffic over the in-service channels. It also causes other non-linear issues including XPM (cross-phase modulation) and FWM (four wave mixing) due to launching high into the fiber than the expected range. If launched lower in power into the fiber than the previously estimated optimal link budget target, the channel may starve for power at the far end receiver (Rx) and resulting a direct negative impact on optical signal to noise ratio (OSNR). All such issues can lead to traffic outage over in-service channels for prolonged period just because of a capacity change in the flexible spectrum DWDM network.

In the systems and methods described herein, an algorithm is developed that allows channels at any location of the spectrum, of any bandwidth size to be added or deleted in incremental power bundles that helps minimizing offset build on in-service channels' power due to amplifier transient changes. The power bundle approach allows adding or deleting channels in multiple steps with controlled amount of power being introduced into the line system in each step interleaved with an in-service channel power optimization process that eliminates any amount of offset build on in-service channels in each incremental power bundled step. This allows keeping the offset on in-service channels minimized or constrained within a certain limit in each power controlled iteration. The systems and methods can be designed considering the possible worst case offset scenarios that serve the following purposes:

(1) The systems and methods help to normalize a system in terms of capacity changes that allows flexible bandwidth channels to be added or deleted in any part of the spectrum irrespective of the presence, bandwidth and the spectral location of in-service channels.

(2) The systems and methods allow system to be agile in terms of photonic actions making it non-blocking for channel add and delete actions and getting rid of any sequential channel actions. It will unblock the sequential nature of channel add and delete so that the action (add/delete) on any channel does not block or defer the action on any other channels, and does not cost any performance impact either on in-service channels.

(3) The systems and methods allow achieving a consistent timing for capacity changes for any number of channels that will help control planes to take more deterministic approaches about physical layer restoration timings before starting a restoration in upper layers of networking.

The systems and methods are applicable to a fixed grid DWDM optical line system as well and brings all the above mentioned advantages. For a fixed grid DWDM system, several methods have been proposed over the years to minimize the static offset effect on in-service channels. A simplest view is to add one or two fixed narrow bandwidth (<=50 GHz) channels at a time, and run an optimization algorithm, such as described in commonly-assigned U.S. Pat. No. 8,364,036, "METHOD AND SYSTEM FOR CONTROLLING OPTICAL NETWORKS," the contents of which are incorporated by reference herein, to eliminate the offset on in-service channels. Such optimization may involve estimating the per channel power at each amplifier site and adjust amplifier gains to ensure the peak in-service channel always maintaining the predefined launch power target. Other approaches include bundling a number of fixed grid channels in order to add or delete depending on the present channel fill in the optical spectrum, and run optimization algorithms between each bundle to minimize offset on in-service channels.

The amount of offset that gets introduced using the channel bundle approach largely depends on the location of both in-service channel(s) and the location where channels will be added or deleted. Hence as shown earlier in the graph 30, even adding one narrow band channel at a time, or having the channel bundle size limited to one channel only does not guarantee to have minimized offset for already in-service channels. The channel bundling approaches also have to be sequential in nature that means adding or deleting of a channel bundle can be started only after the previous bundle action is completed, and offsets are being minimized. Such sequential approach consumes considerable amount of time when capacity change needs to take place for large number of channels over multiple channel access sites. The sequential constraint of channel bundling not only limits any capacity change actions (add/delete) to be sequenced but also forces the channel access sites to operate in sequence. Regardless of these issues, the channel bundling approaches currently in practice assumes a fixed grid spectrum, and cannot be applied in case of capacity changes with a large bandwidth flexible spectrum where, if applied, will end up with large offset on in-service channels.

Another approach, for a fixed grid spectrum, is to use channel holders to occupy the spectrum all the times so that channels in the spectrum can be switched between channel holders and the traffic channels, such as described in commonly-assigned U.S. Pat. No. 8,260,141, "METHOD TO TRANSFORM A DYNAMIC ANALOG OPTICAL NETWORK TO A DIGITAL REPRESENTATION," the contents of which are incorporated by reference herein. Since the system remains full in this case, the existing traffic carrying in-service channels do not experience much of an offset here. However channel holders is an expensive solution for network operators that requires external equipment or an additional noise generator to be inserted in every channel access section, and need to occupy an extra port in the channel access actuator module (e.g. on a wavelength selective switch (WSS)). A digital on/off switching, although works in fixed grid spectrum, will not work in case of handling large bandwidth flexible spectrum channels as such on/off switching may create static offset on in-service channels depending on the location and bandwidth of the present spectrum. The systems and methods will allow adding/deleting channels in either fixed grid or flexible spectrum regardless of the spectral location, bandwidth size of in-service channels and added channels using commonly deployed photonic components in an optical line system.

Figure 3:
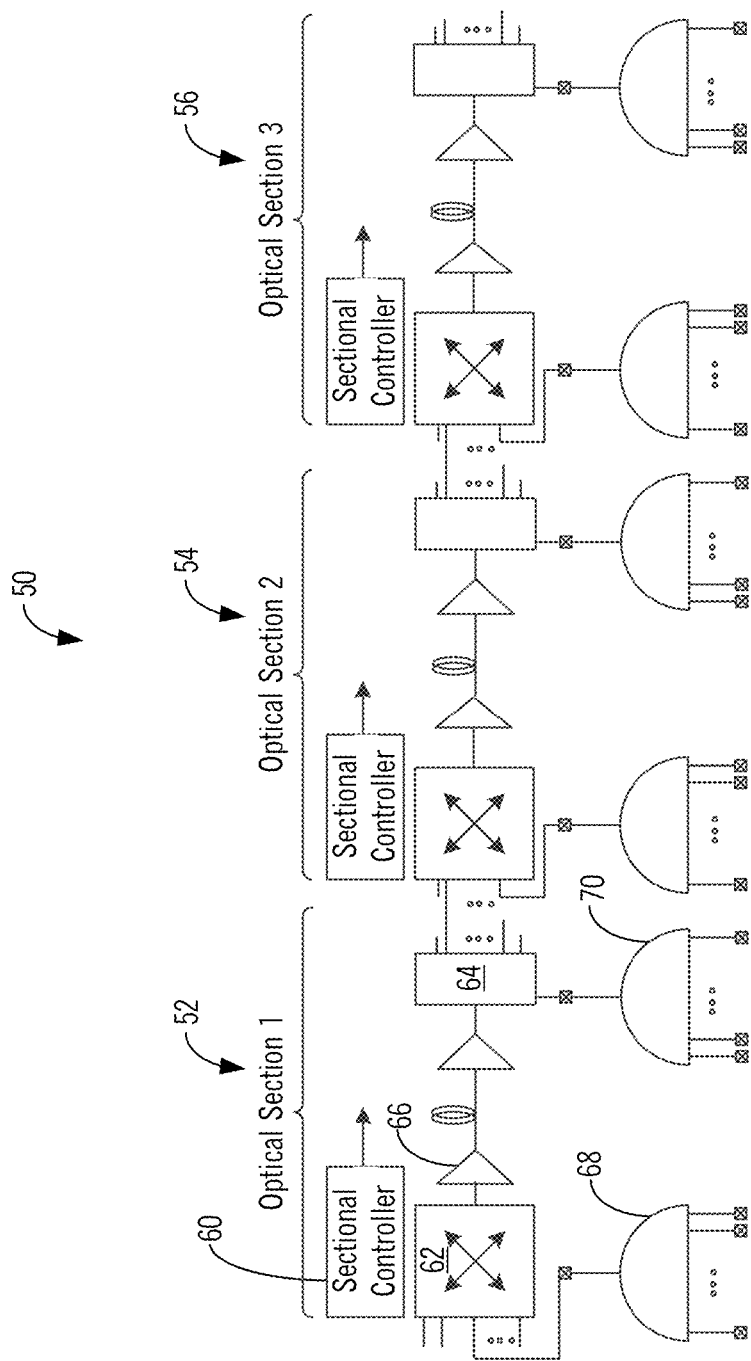
FIG. 3 is a network diagram of an exemplary DWDM network with multiple optical sections.

Referring to FIG. 3, in an exemplary embodiment, a network diagram illustrates an exemplary DWDM network 50 with multiple optical sections 52, 54, 56. A core concept of the systems and methods and associated power bundle approach lies on adding or deleting channels in an optical section by changing their power in multiple iterations in order to minimize the offset on in-service channels in each iteration and running a channel offset eliminator algorithm interleaved between iterations to alleviate any offset on in-service channels by re-adjusting amplifier gains in each section. The exemplary DWDM network 50 is presented as an exemplary illustration of the optical sections 52, 54, 56. Generally, an optical section is defined from the start of a channel access site until the start of the next channel access site, i.e. from add to drop. Stated differently, an optical section represents the all-optical path of a channel through various amplifiers. In the exemplary DWDM network 50, each of the optical sections 52, 54, 56 includes a sectional controller 60, an ingress degree 62, an egress degree 64, one or more amplifiers 66, a multiplexer 68, and a demultiplexer 70. The ingress degree 62 can include a WSS and the egress degree 64 can include a 1:N splitter. Of course, other implementations and devices are also contemplated to form the optical sections 52, 54, 56 and other optical sections.

Variously, the degree 62 can include a channel actuator device such as the WSS or the splitter. The systems and methods described herein are applicable for capacity changes in any channel access sections involving WSS based ROADMs (Reconfigurable OADMs), TOADMs (Tunable OADMs), or GOADMs (Group OADMs), Colorless-Directionless, and CDC (contentionless-directionless-colorless) architectures, and the like. That is, the DWDM network 50 is illustrated as an exemplary system and the systems and methods described herein contemplate operation on any DWDM system where individual channel powers are adjustable through various adjustment mechanisms, and the aforementioned list is presented solely for illustration purposes.

In the example of FIG. 3, the optical section 52, 54, 56 is defined from the multiplexer 68 to the demultiplexer 70, i.e. between channel access points. At various points in the optical section 52, 54, 56, there are opportunities to alter power parameters such as at the WSS, the 1:N splitter, the amplifiers 66, variable optical attenuators (VOAs), launch power at the multiplexer 68, etc. The sectional controller 60 is a computational device that is designed to run at the head end of each of the optical sections 52, 54, 56 to coordinate the adjustments of channels actuator attenuations and amplifier gain adjustments for each iteration of power bundle capacity changes, i.e. control of the opportunities to alter power parameters.

Figure 4:
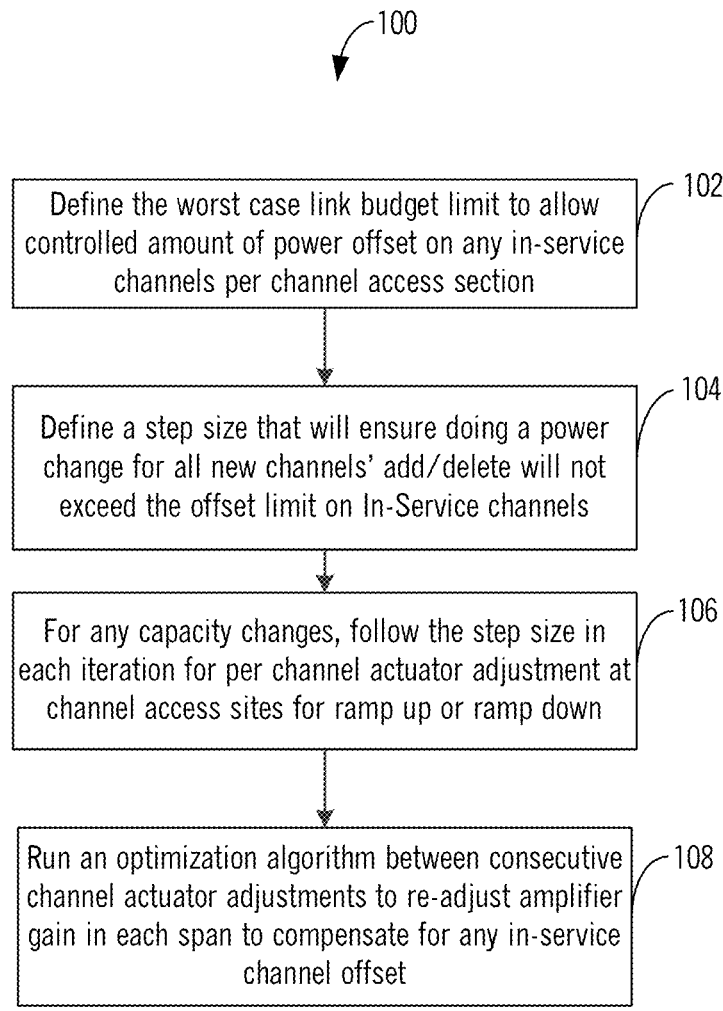
FIG. 4 is a flowchart of a method for implementing a power bundle approach.
Figure 5:
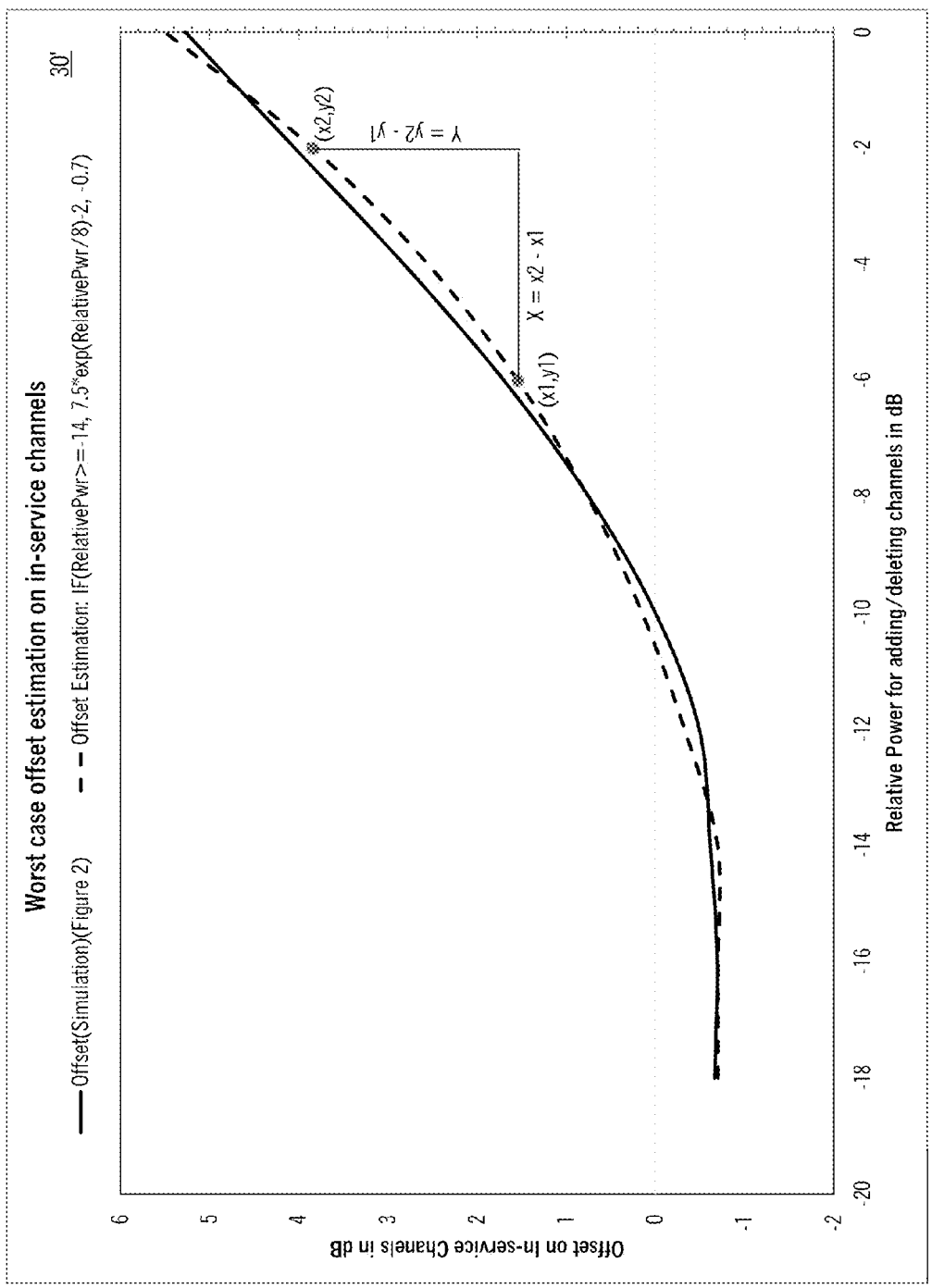
FIG. 5 is a graph of an exemplary worst case offset estimation on in-service channels for the method of FIG. 4.

Referring to FIG. 4, in an exemplary embodiment, a flowchart illustrates a method 100 for implementing a power bundle approach. The method 100 can be implemented on the sectional controller 60 or the like. For a first step, the method 100 defines the worst case link budget limit to allow controlled amount of power offset on any in-service channels per channel access section (step 102). That is, the first step for designing a power bundle approach is to determine the maximum amount of power offset on any of the existing in-service channels per optical section. The step 102 can be based on calculations, simulations, etc. For example, the graph 30 in FIG. 2 provides data for a specific system (i.e., 6 spans, 7 amplifiers). Thus, the power offset data can be derived from a link budget exercise, such as shown earlier in the graph 30. Referring to FIG. 5, in an exemplary embodiment, a graph 30' illustrates an exemplary worst case offset estimation on in-service channels. The graph 30' is similar to the graph 30 in FIG. 2 and also includes the capacity change 32. The capacity change 32 can be mathematically expressed by a line 32' which can provide a worst case offset estimation for the specific system (i.e., 6 spans, 7 amplifiers) according to the following formula:

If (Relative Power for adding/deleting channels compared to in-service channels≥−14), $$\text{Offset Estimation on In Service Channel} = 7.5 \cdot e^{\frac{RelativePwr}{8}} - 2; \quad \text{eq. (1)}$$

else $$\text{Offset Estimation on In Service Channel} = -0.7. \quad \text{eq. (2)}$$

Again, the step 102 is an estimate based on an analysis, and the outcome is a worst case offset estimate on the in-service channels based on the relative Power for adding/deleting channels compared to in-service channels. The aforementioned calculation and the graph 32' is applicable to the capacity change 32, i.e., adding a 400 GHz bandwidth channel in a blue part of the spectrum along with an existing in-service channel at 50 GHz bandwidth and located at 1554.13 nm. Different configurations and capacity change scenarios could have different graphs and/or mathematical expressions.

The method 100 next defines a step size that will ensure doing a power change for all new channel additions/deletions will not exceed the offset limit (determined in the step 102) on in-service channels (step 104). That is, the step 104 is to define the maximum step size for power changes for the new channels to be added or deleted. The allowable step size to maintain the offset limit on the in-service channels can be different at different stages of power levels. For the simplistic view of the implementation and considering the worst case scenarios, a typical allowable power offset on in-service channels is considered to be ±1 dB, although other values are also contemplated.

A channel actuator controller can be developed to control the step size during any capacity changes for the channels to be added or deleted while keeping the loss targets for in-service channels fairly constant. By changing the power of the channels to be added or deleted by the required step size, a controlled amount of offset is expected to appear on the in-service channel(s) that should not exceed the pre-defined allowable power offset (±1 dB). From the offset estimation equation (Eq. (1)) presented above, the controller convergence steps, for example, can be derived as below:

$$y_1 = 7.5 * e^{\frac{x_1}{8}} - 2 \quad \text{eq. (3)}$$

$$y_2 = 7.5 * e^{\frac{x_2}{8}} - 2$$

$$|y_2 - y_1| \leq \text{Offset Limit in dB}$$

$$\text{Controller Step Size} = X = |x_2 - x_1|,$$

$$\text{where } x_2 \leq 8 * \ln\left[\frac{\text{Offset Limit in dB}}{7.5} + e^{\frac{x_1}{8}}\right]$$

Figure 6:
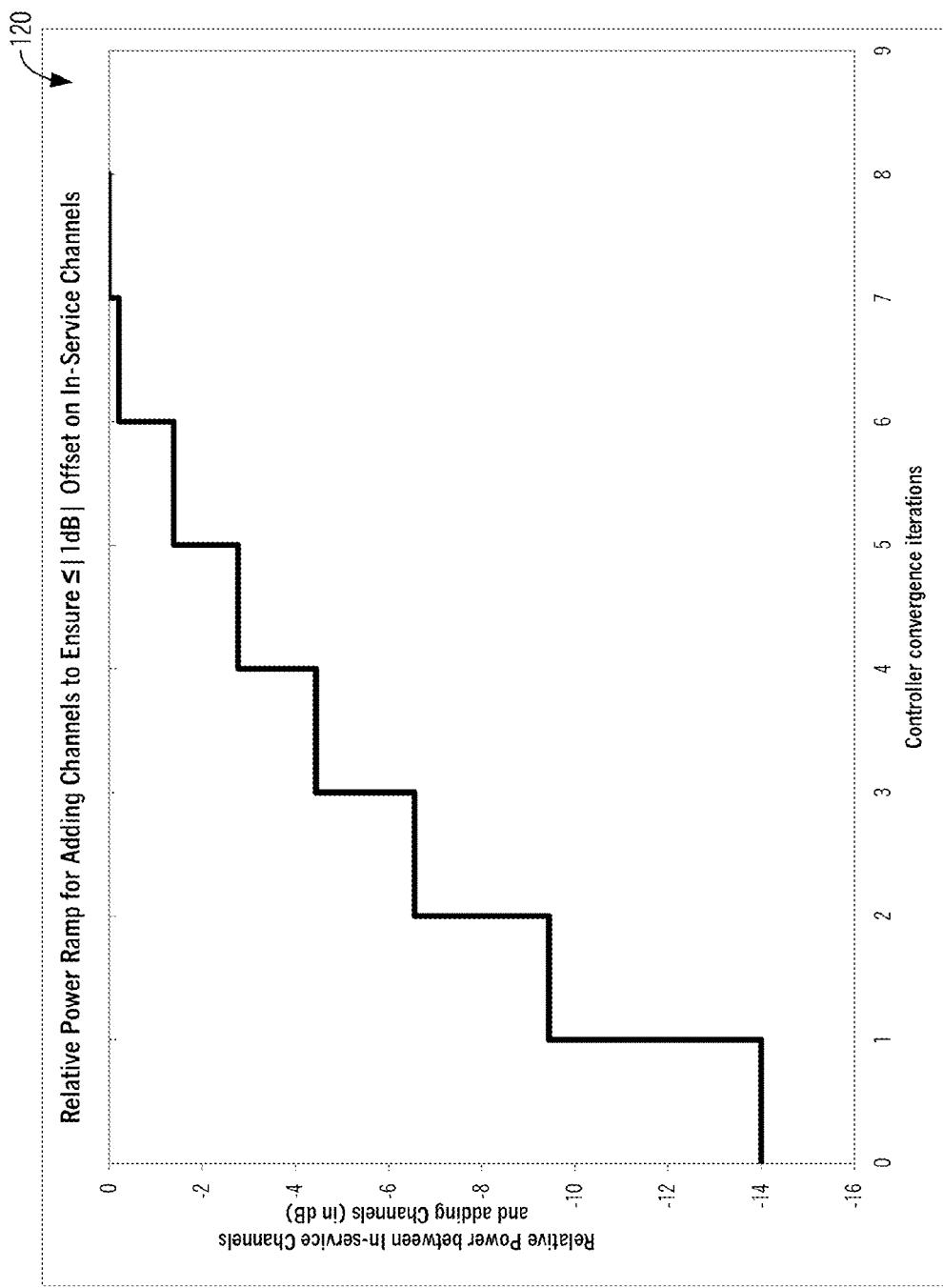
FIG. 6 is a graph of an exemplary implementation of various iterative steps showing step size for each successive iteration.

Assuming relative power for add channels compared to in-service channels is ≥−14 dB, the controller convergence steps in each power bundle iteration can be derived from Eq. (3) that will ensure the offset incurred in each power bundle iteration will never exceed the predefined limit (±1 dB). Of note, the aforementioned equations can be adjusted based on the link budget analysis and system type. That means, based on an analysis, if a system wide or per optical section wide optical performance margin (in terms of BER, OSNR or dBQ) becomes available for all in-service channels that can tolerate larger power offsets per section, the above mentioned parameter in Eq. (3) can be dynamically modified to take advantage of that deriving larger controller step size and faster convergence per section. These equations provide two points of the graph 30, 30' on the y axis to ensure that the step size for power addition or deletion, i.e. the x axis, is less than the defined offset limit in the step 104. In this example, this ensures that each step size creates no more than 1 dB offset in either direction on in-service channels. The method 100 includes, for any capacity changes, following the step size in each iteration for per channel actuator adjustment at channel access sites for ramp up or ramp down (step 106). Referring to FIG. 6, in an exemplary embodiment, a graph 120 illustrates an exemplary implementation of various iterative steps showing step size for each successive iteration. Again, the graph 120 is based on the capacity change 32 and it shows eight iterations to add the 400 GHz bandwidth channel in a blue part of the spectrum along with an existing in-service channel at 50 GHz bandwidth and located at 1554.13 nm. With each iteration, the relative power, i.e. step size, is adjusted based on Eq. (3) above.

The method 100 also includes running an optimization algorithm between consecutive channel actuator adjustments to re-adjust amplifier gain in each span to compensate for any in-service channel offset (step 108). That is, as part of the final step 108, any offset (≈±1 dB) incurred on the in-service channels needs to be taken out before proceeding to the next actuator controller iteration. To do that, the channel spectrum can be either estimated or measured at each amplifier site where each amplifier gain can then be re-adjusted to alleviate any cumulative offset generated on the peak in-service channel relative to its last optimal power profile. The sectional controller 60 can continue with the next channel actuator iteration interleaved with amplifier gain adjustments until the channels to be added or deleted are converged to their final target.

Figure 7:
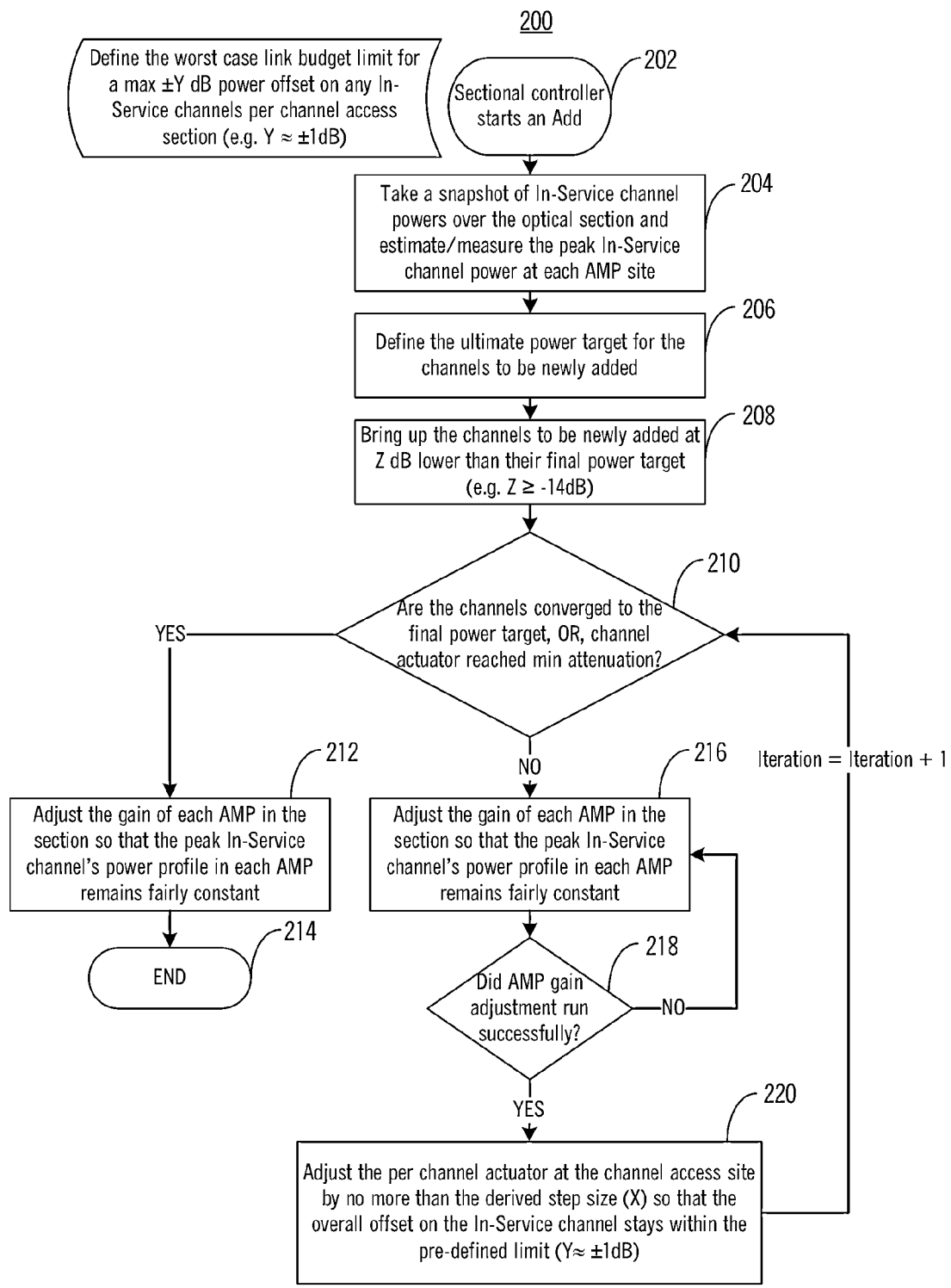
FIG. 7 is a flowchart of a method for a power bundle assisted channel add per section.

Referring to FIG. 7, in an exemplary embodiment, a flowchart illustrates a method 200 for a power bundle assisted channel add per section. Again, the method 200 contemplates operation by a controller such as the sectional controller 60. The method 200 provides additional details with respect to the method 100 in an add capacity change. The method 200 begins first with a defined worst case link budget limit for a max ±Y dB power offset on any in-service channels per channel access section (e.g. Y≈±1 dB). With the max power offset defined, the method 200 begins at the sectional controller (step 202). The method 200 takes a snapshot of in-service channel powers over the optical section and estimates/measures the peak in-service channel power at each amplifier site (step 204). Here, the sectional controller 60 is required to estimate or measure the in-service channels' spectrum over the section and take a snapshot of the peak in-service channel power at each amplifier location before starting any add operation.

The method 200 includes defining the ultimate power target for the channels to be newly added (step 206). Here, a launch power target to the fiber is defined for the channels to be newly added that can be further scaled to define a per channel power target for a channel controller which will be required to control the channel actuator attenuation. The method 200 includes bringing up the channels to be newly added at Z dB lower than their final power target (e.g. Z≥−14 dB) (step 208). For example, Z is a starting point and can be −14 dB or the like. Next, the method 200 performs a damped controller designed for the channel controller to ramp up the add channels to the target power in multiple iterations that will respect the step size as defined earlier in Eq. (3) (steps 210-220).

The damped controller checks if the channels converged to the final power target or if channel actuator reached min attenuation (step 210). If so, the damped controller adjust the gain of each amplifier in the section so that the peak in-service channel's power profile in each amplifier remains fairly constant (step 212), and the method 200 ends (step 214). If the channels have not converged to the final power target or if channel actuator has not reached min attenuation (step 210), the damped controller adjust the gain of each amplifier in the section so that the peak in-service channel's power profile in each amplifier remains fairly constant (step 216). The method 200 if the amplifier gain adjustment ran successfully (step 218), and if not, the method 200 repeats the step 216. If the amplifier gain adjustment ran successfully (step 218), the method 220 adjusts the per channel actuator at the channel access site by no more than the derived step size (X) so that the overall offset on the In-Service channel stays within the pre-defined limit (Y≈±1 dB) (step 220), increments an iteration count, and returns to the step 210. A channel offset eliminating algorithm has to run interleaved between two consecutive channel controller iterations that should be designed to alleviate any offset on the in-service channels by re-adjusting gain at each amplifier site so that the power for peak in-service channel at each amplifier site remains fairly constant.

Figure 8A:
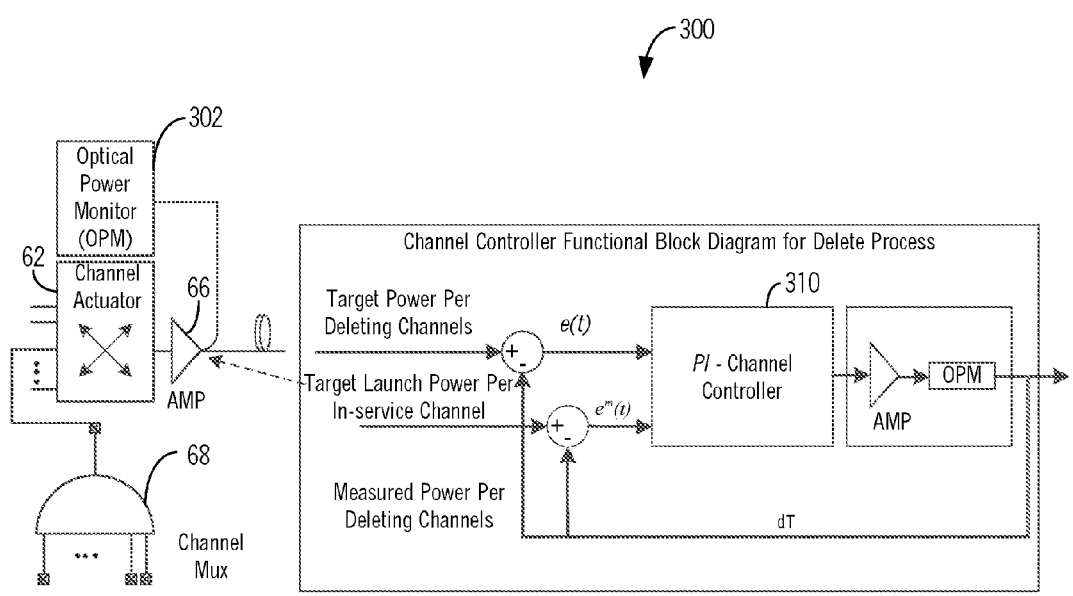
FIGS. 8(a) and 8(b) are is a functional block diagrams illustrating a channel controller for a delete process (FIG. 8(a)) and an add process (FIG. 8(b)) for a channel access site.
Figure 8B:
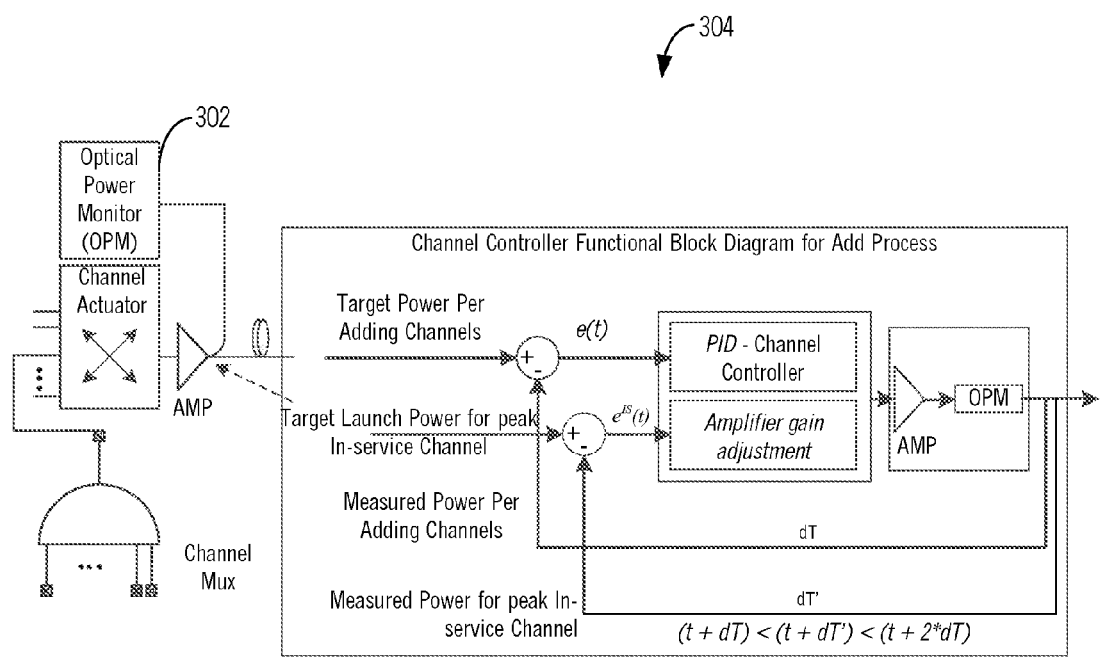

Referring to FIGS. 8(a) and 8(b), in an exemplary embodiment, a functional block diagram illustrates a channel controller for a delete process 300 (FIG. 8(a)) and an add process 304 (FIG. 8(b)) for a channel access site. The delete process 300 is illustrated at the channel ingress point in the optical section including the multiplexer 68, a channel actuator 62, an amplifier 66, and an optical power monitor (OPM) 302 coupled to an output of the amplifier 62. The sectional controller 60 takes a similar snapshot of peak in-service channels at an amplifier site before starting any delete action. A power target should be defined for channels to be deleted which should be ideally ≥15 dB lower than the in-service channels power level. A PI (proportional-integral) controller 310 can be designed to control the channel actuators in order to ramp down the deleting channels' power while maintaining maximum offset limit on the in-service channels. The PI controller 310 allows the channels to be deleted in smaller steps while their power is closer to the in-service channels' power, and in larger steps as it will move further away from in-service channels in terms of power.

The PI controller 310 includes:
Target Power per Channel for Delete≤(Target Launch Power for in-service Channels−15 dB)
$e(t)$=Target Power per Deleting Channels−Measured Power Per Deleting Channels
$e'''(t)$=Target Launch Power for in-service Channel with 0 dB differential bias+Differential Power Adjustment (if any)−Measured Power Per Deleting Channels
PI-Controller Response, $PI_{Response}=Kp*e(t)+Ki\int e(t)dt+Km\int e'''(t)dt$
PI-Controller Response in discrete steps, $PI_{Response}=Kp*e(t)+Ki*e(t)*dT+Km*e'''(t)*dT$
Preferred value for the PI coefficients is Kp=0.20, Ki=0.01, Km=−0.05, and dT=4 s.

Figure 9:
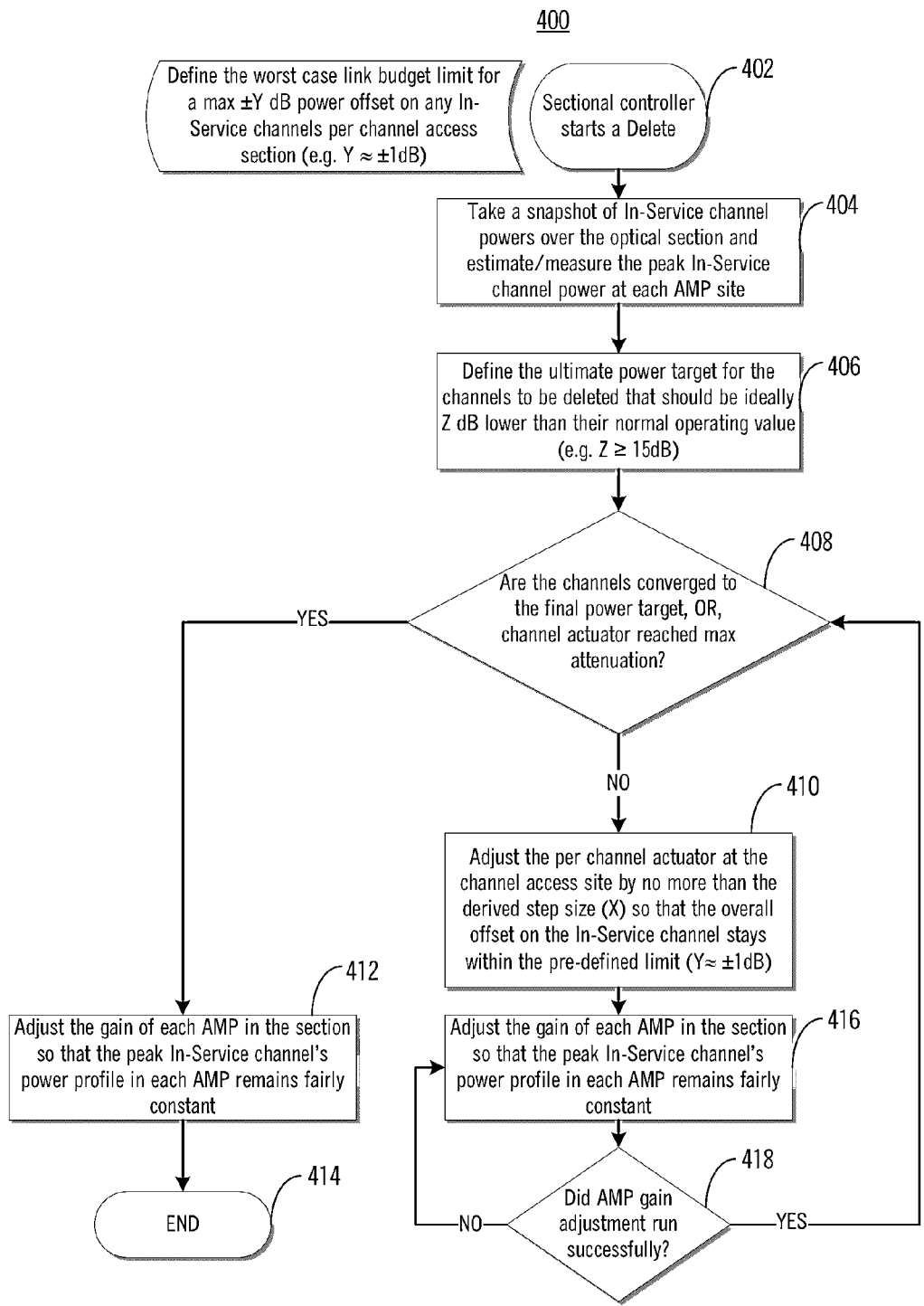
FIG. 9 is a flowchart of a method for a power bundle assisted delete per section.

Referring to FIG. 9, in an exemplary embodiment, a flowchart illustrates a method 400 for a power bundle assisted delete per section. Again, the method 400 contemplates operation by a controller such as the sectional controller 60. The method 400 provides additional details with respect to the method 100 in a delete capacity change. Similar to the add process, the channel controller during the delete will have to run interleaved with channel offset eliminator function that will effectively eliminate any offset generated on the in-service channels incurred at each channel controller iteration cycle.

The method 400 starts with defining the worst case limit for a max ±Y dB power offset on any In-Service channels per channel access section (e.g. Y≈±1 dB). With the max power offset defined, the method 400 begins at the sectional controller (step 402). The method 400 includes taking a snapshot of in-service channel powers over the optical section and estimate/measure the peak in-service channel power at each amplifier site (step 404). The method 400 defines the ultimate power target for the channels to be deleted that should be ideally Z dB lower than their normal operating value (e.g. Z≥15 dB) (step 406).

Next, the method 400 operates steps 408-418 to converge to a final power target. The method 400 checks if the channels converged to the final power target or the channel actuator reached max attenuation (step 408). If so, the method 400 adjusts the gain of each amplifier in the section so that the peak in-service channel's power profile in each amplifier remains fairly constant (step 412), and the method 400 ends (step 414). If the channels have not converged to the final power target or the channel actuator has not reached max attenuation (step 408), the method 400 adjusts the per channel actuator at the channel access site by no more than the derived step size (X) so that the overall offset on the In-Service channel stays within the pre-defined limit (Y≈±1 dB) (step 410). The method 400 next adjusts the gain of each amplifier in the section so that the peak in-service channel's power profile in each amplifier remains fairly constant (step 416). The method 400 checks if the amplifier gain adjustment was successful in the step 416 (step 418), and if not, returns to the step 416, and if so, returns to the step 408.

The advantages of power bundle capacity changes can be explored in many ways. By default, the proposed power bundle approach assumes a maximum of ±1 dB static power offset can be applied on in-service channels end-to-end in the network only during the time of capacity change, and all the internal channel controllers' slew rates can be designed to respect the offset as defined earlier in Eq. (3). However if a network wide system margin in terms of tolerating power offsets e.g. X dB becomes available for all in-service channels where |X|>±1 dB, the internal channel controllers' coefficients can be further modified to acquire a faster slew rate to achieve to the target.

Figure 10:
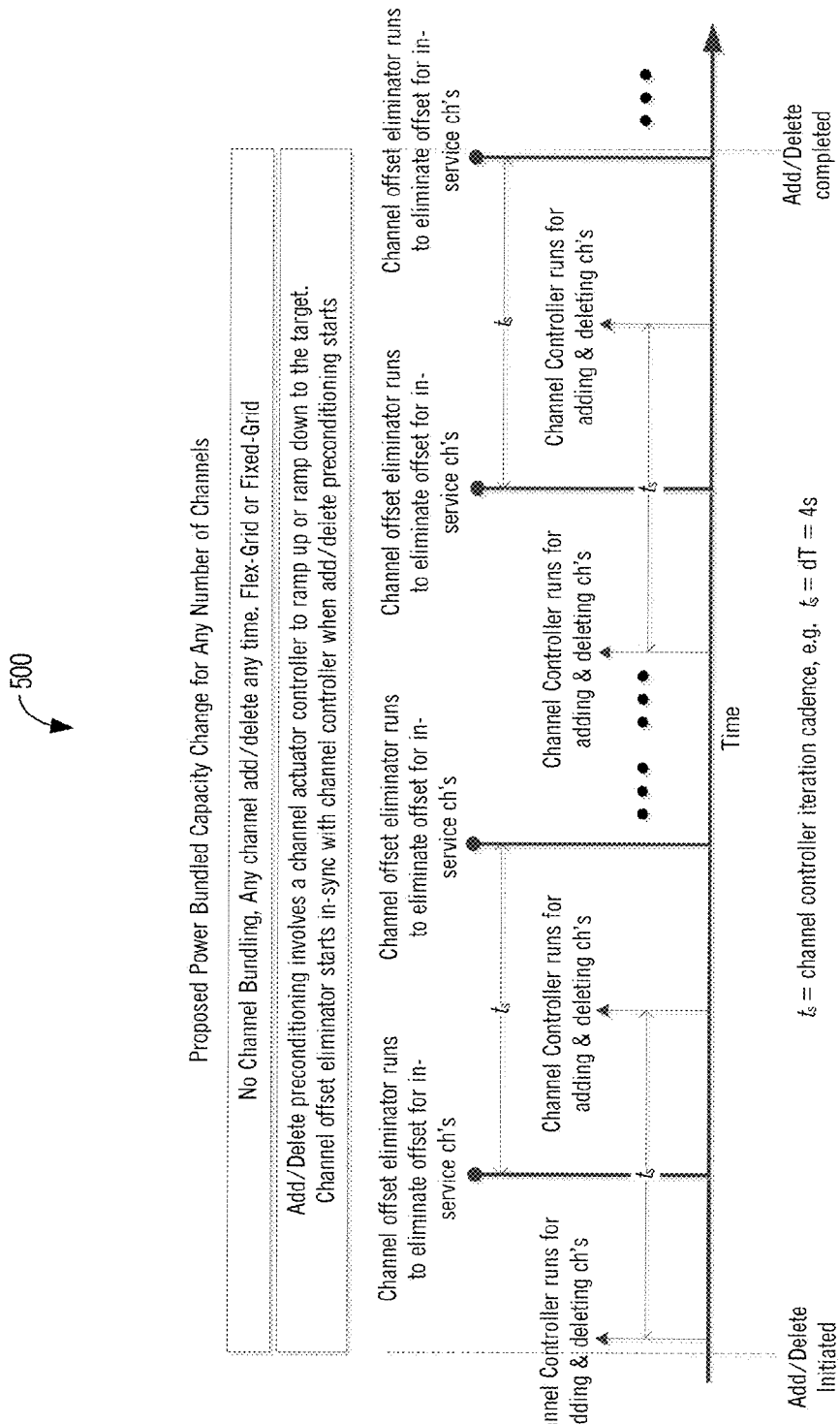
FIG. 10 is a timing diagram of an exemplary interleaved sequence for power bundle assisted capacity changes.

Referring to FIG. 10, in an exemplary embodiment, a timing diagram illustrates an exemplary interleaved sequence 500 for power bundle assisted capacity changes. Since the methods 100, 200, 400 can be designed considering the worst case power impact on in-service channels in any add/delete scenario, it unveils the possibility of doing add and delete at the same time in an optical section. Such time variant interleaved process is further illustrated in the exemplary interleaved sequence 500 that describes that the designated channel controllers for adding and deleting channels can run at the same time on different channel actuators while interleaving with a single iteration of channel offset eliminator function that will effectively eliminate any offset incurred on the in-service channel due to the preceding channel controllers' iteration.

Timing is always important for any layer 0 restoration schemes and capacity changes in the optical network. The advantage of the proposed power bundle methods 100, 200, 400 is that the illustrated timing for capacity changes remains unchanged whether the method is used in fixed grid or in a flexibly utilized spectral environment, and remains unaffected with the number of channels, their spectral locations, size of their bandwidth, or by any other in parallel add/delete actions taking place in the same optical line system in other part of the spectrum. That is the proposed power bundle methods 100, 200, 400 makes the capacity change actions spectrum irrelevant and more agile in nature with assured predictable timings for upper layer control planes.

A core concept of the systems and methods described herein lies in adding or deleting channels in an optical section by changing their power in multiple iterations in order to minimize the offset on in-service channels in each iteration and running a channel offset eliminator algorithm interleaved between iterations to alleviate any offset on in-service channels by re-adjusting amplifier gains in each section. The controller step size for adding or deleting channels is derived from the worst case offset that in-service channels can tolerate. The concept can be implemented for adding channels or for deleting channels, or for both add and delete actions that can be combined in a single channel controller iteration while interleaving with a single iteration of channel offset eliminator that will effectively eliminate any offset incurred on the in-service channels due to the preceding channel controllers' iteration. The systems and methods allow adding/deleting channels in a flexibly gridded spectrum irrespective of the number of channels, their bandwidth size or location in the spectrum. The systems and methods allow adding/deleting channels in the conventional fixed grid spectrum irrespective of the number of channels, their bandwidth size or location in the spectrum. The systems and methods are applicable for capacity changes in any channel access sections involving WSS based ROADMs (Reconfigurable OADMs), TOADMs (Tunable OADMs), or GOADMs (Group OADMs), Colorless-Directionless, and CDC (contentionless-directionless-colorless) architectures. The systems and methods are applicable for any type of amplified optical links including erbium doped fiber amplifier (EDFA) links and Raman. The systems and methods are applicable for C-band DWDM spectrum as well as for L-band DWDM spectrum or the like.

Figure 11:
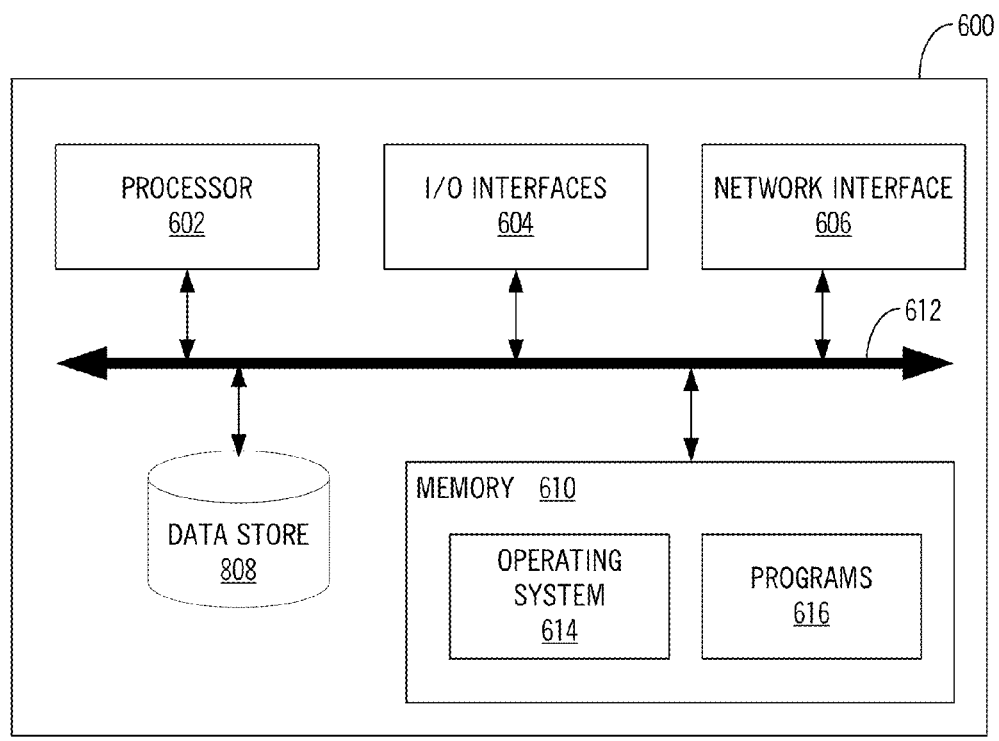
FIG. 11 is a block diagram of an exemplary implementation of a controller.

Referring to FIG. 11, in an exemplary embodiment, a block diagram illustrates an exemplary implementation of a controller 600. For example, the controller 600 can include the sectional controller 60. The controller 600 can be a digital processing device that, in terms of hardware architecture, generally includes a processor 602, input/output (I/O) interfaces 604, a network interface 606, a data store 608, and memory 610. It should be appreciated by those of ordinary skill in the art that FIG. 11 depicts the power controller 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example but not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 can include address, control, and/or data connections to enable appropriate communications among the aforementioned components.

The processor 602 is a hardware device for executing software instructions. The processor 602 can be any custom made or commercially available processor, a central processing unit (CPU), an auxiliary processor among several processors associated with the controller 600, a semiconductor-based microprocessor (in the form of a microchip or chip set), or generally any device for executing software instructions. When the controller 600 is in operation, the processor 602 is configured to execute software stored within the memory 610, to communicate data to and from the memory 610, and to generally control operations of the controller 600 pursuant to the software instructions. The I/O interfaces 604 can be used to receive user input from and/or for providing system output to one or more devices or components. For example, if the controller 600 is included in a network element, the I/O interfaces 604 can include backplane connections or the like to communicate with other components in the network element. The network interface 606 can be used to enable the controller 600 to communicate on a network. For example, the I/O interfaces 604 and/or the network interface 606 can communicatively couple the controller 600 to the WSS 62, the amplifiers 66, the OPM 302, etc.

The data store 608 can be used to store data. The data store 608 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 can incorporate electronic, magnetic, optical, and/or other types of storage media. The memory 610 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 can incorporate electronic, magnetic, optical, and/or other types of storage media. Note that the memory 610 can have a distributed architecture, where various components are situated remotely from one another, but can be accessed by the processor 602. The software in memory 610 can include one or more software programs, each of which includes an ordered listing of executable instructions for implementing logical functions. The software in the memory 610 includes a suitable operating system (O/S) 614 and one or more programs 616. The operating system 614 essentially controls the execution of other computer programs, such as the one or more programs 616, and provides scheduling, input-output control, file and data management, memory management, and communication control and related services. The one or more programs 616 may be configured to implement the various processes, algorithms, methods, techniques, etc. described herein. For example, the programs 616 can be configured to implement the methods 100, 200, 400.

Additionally, it will be appreciated that some exemplary embodiments described herein, such as the controller 600, may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, the power controller 150, 150A etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, comprising:
performing an analysis to determine an amount of power offset on any in-service channels in an optical section between two channel access points due to a capacity change with a channel in the optical section;
defining a step size for the channel involved in the capacity change so that the in-service channels do not experience more than an offset limit due to the capacity change; and
performing the capacity change in one or more iterations using the step size and performing an optimization after each of the one or more iterations to compensate for power offsets on the in-service channels caused by the each of the one or more iterations, wherein the optimization comprises determining and changing amplifier gain in each span.

2. The method of claim 1, further comprising:
adjusting the step size in each of the one or more iterations for the capacity change of the channel.

3. The method of claim 1, wherein the capacity change comprises one of adding or deleting channel of a flexible amount of bandwidth.

4. The method of claim 3, further comprising:
performing the analysis to determine a worst case that the in-service channels can tolerate when adding or deleting the channel.

5. The method of claim 1, further comprising:
simultaneously performing an addition and a deletion of the channel and a second channel and interleaving the optimization therebetween.

6. The method of claim 1, wherein the capacity change comprises adding or deleting channels in a flexible spectrum irrespective of the number of channels, their bandwidth size or location in the flexibly gridded spectrum.

7. The method of claim 1, wherein the capacity change comprises adding or deleting channels in the fixed grid spectrum irrespective of the number of channels, their bandwidth size or location in the fixed grid spectrum.

8. The method of claim 1, wherein the optical section comprises start of a channel access site until the start of a next channel access site, and wherein channel access utilizes any of Wavelength Selective Switch (WSS) based Reconfigurable Optical Add/Drop Multiplexers (OADMs) (ROADMs), Tunable OADMs (TOADMs), or Group OADMs (GOADMs), Colorless-Directionless, and Contentionless-Directionless-Colorless architectures.

9. The method of claim 1, wherein the optical section comprises at least one Raman optical amplifier.

10. The method of claim 1, further comprising:
performing the analysis due to a capacity change with a channel via one of simulation or experimentation and deriving a mathematical expression based thereon to compute the step size.

11. The method of claim 2, further comprising:
based on available margin in terms of OSNR, BER, or dBQ, accelerating or decelerating the step size in each of the one or more iterations for the capacity change of the channel.

12. A controller, comprising:
an interface to one or more optical devices in an optical section;
a processor communicatively coupled to the interface; and
memory storing instructions that, when executed, cause the processor to:
perform an analysis to determine an amount of power offset on any in-service channels in an optical section between two channel access points due to a capacity change with a channel in the optical section;
define a step size for the channel involved in the capacity change so that the in-service channels do not experience more than an offset limit due to the capacity change; and
cause the one or more optical devices to perform the capacity change in one or more iterations using the step size and cause the one or more optical devices to perform an optimization after each of the one or more iterations to compensate for power offsets on the in-service channels caused by the each of the one or more iterations, wherein the optimization comprises a determination and a change of amplifier gain in each span.

13. The controller of claim 12, wherein the instructions, when executed, further cause the processor to:
adjust the step size in each of the one or more iterations for the capacity change of the channel.

14. The controller of claim 12, wherein the capacity change comprises one of adding or deleting channel of a flexible amount of bandwidth, and wherein the instructions, when executed, further cause the processor to:

perform the analysis to determine a worst case that the in-service channels can tolerate when adding or deleting the channel.

15. The controller of claim 12, wherein the instructions, when executed, further cause the processor to:

simultaneously perform an addition and a deletion of the channel and a second channel and interleaving the optimization therebetween.

16. The controller of claim 12, wherein the capacity change comprises adding or deleting channels in a flexible spectrum irrespective of the number of channels, their bandwidth size or location in the flexibly defined spectrum;

wherein the capacity change comprises adding or deleting channels in the fixed grid spectrum irrespective of the number of channels, their bandwidth size or location in the fixed grid spectrum.

17. The controller of claim 12, wherein the optical section comprises start of a channel access site until the start of a next channel access site, and wherein channel access utilizes any of Wavelength Selective Switch (WSS) based Reconfigurable Optical Add/Drop Multiplexers (OADMs) (ROADMs), Tunable OADMs (TOADMs), or Group OADMs (GOADMs), Colorless-Directionless, and Contentionless-Directionless-Colorless architectures.

18. The controller of claim 12, wherein the instructions, when executed, further cause the processor to:

perform the analysis due to a capacity change with a channel via one of simulation or experimentation and deriving a mathematical expression based thereon to compute the step size.

19. An optical section, comprising:
a first channel access point;
a second channel access point;
one or more amplifiers between the first channel access point and the second channel access point; and
a controller communicatively coupled to the first channel access point, the second channel access point, and the one or more amplifiers, wherein the controller is configured to:
perform an analysis to determine an amount of power offset on any in-service channels in an optical section defined between the first channel access point and the second channel access point due to a capacity change with a channel;
define a step size for the channel involved in the capacity change so that the in-service channels do not experience more than an offset limit due to the capacity change; and
cause the first channel access point, the second channel access point, and the one or more amplifiers to perform the capacity change in one or more iterations using the step size and cause the one or more optical devices to perform an optimization after each of the one or more iterations to compensate for power offsets on the in-service channels caused by the each of the one or more iterations, wherein the optimization comprises a determination and a change of amplifier gain in each span of the one or more amplifiers.

20. The optical section of claim 19, wherein the capacity change comprises adding or deleting channels in a flexibly defined spectrum irrespective of the number of channels, their bandwidth size or location in the flexibly defined spectrum.

* * * * *